(12) United States Patent
Gantman et al.

(10) Patent No.: US 8,989,390 B2
(45) Date of Patent: Mar. 24, 2015

(54) CERTIFY AND SPLIT SYSTEM AND METHOD FOR REPLACING CRYPTOGRAPHIC KEYS

(75) Inventors: Alexander Gantman, Poway, CA (US); Gregory G. Rose, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1304 days.

(21) Appl. No.: 11/609,302

(22) Filed: Dec. 11, 2006

(65) Prior Publication Data

US 2007/0223706 A1  Sep. 27, 2007

Related U.S. Application Data

(60) Provisional application No. 60/749,718, filed on Dec. 12, 2005.

(51) Int. Cl.
*H04L 29/06* (2006.01)
*H04L 9/08* (2006.01)
(Continued)

(52) U.S. Cl.
CPC ............ *H04L 9/0891* (2013.01); *G06F 21/34* (2013.01); *G06F 21/602* (2013.01); *G06F 21/77* (2013.01);
(Continued)

(58) Field of Classification Search
CPC ........... H04L 9/0886; H04L 9/08; H04L 9/32; H04L 9/3276; H04L 9/085; G06F 21/34
USPC .................. 380/277, 286; 713/189; 726/1–4, 726/16–17, 26–30
See application file for complete search history.

(56) References Cited

U.S. PATENT DOCUMENTS 5,799,086 A * 8/1998 Sudia ............................. 705/76
6,118,874 A * 9/2000 Okamoto et al. ............. 380/282
(Continued)

FOREIGN PATENT DOCUMENTS

EP 0907270 4/1999
EP 1235135 8/2002
(Continued)

OTHER PUBLICATIONS

Khurana H et al: "Reasoning about joint administration of access policies for coalition resources", Proceedings of the 22nd. International Conference on Distributed Computing Systems. ICDCS 2002. Vienna, Austria, Jul. 2-5, 2002, International Conference on Distributed Computing Systems, Los Alamitos, CA : IEEE Comp. Soc, US, vol. Conf. 22, Jul. 2, 2002, pp. 390-399, XP010595555.
(Continued)

*Primary Examiner* — Matthew Smithers
*Assistant Examiner* — Phy Anh Vu
(74) *Attorney, Agent, or Firm* — Won Tae C. Kim

(57) ABSTRACT

A feature is provided that facilitates securely creating and/or replacing cryptographic keys. A first key pair is created comprising first private key and first public key. A second (spare) key pair is created comprising second private key and second public key. The second key pair is associated with the first private key. The second key pair is divided into shares and distributed to at least two shareholders. When the first key pair is to be replace, the second key pair is recreated and authenticated with at least a portion of the distributed shares. A trust level is associated with the second key pair corresponding to a trust level of the first key pair. The first key pair may be invalidated upon authentication of the second key pair. Further configurations provide for the creation of additional spare key pairs.

30 Claims, 9 Drawing Sheets

(51) Int. Cl.
 *G06F 21/34* (2013.01)
 *G06F 21/60* (2013.01)
 *G06F 21/77* (2013.01)
 *H04L 9/32* (2006.01)

(52) U.S. Cl.
 CPC .............. *H04L 9/085* (2013.01); *H04L 9/3268* (2013.01); *G06F 2221/2107* (2013.01); *G06F 2221/2149* (2013.01); *G06F 2221/2153* (2013.01)
 USPC .......................................... 380/286; 713/156

(56) References Cited

U.S. PATENT DOCUMENTS

| | | | | |
|---|---|---|---|---|
| 6,279,111 | B1* | 8/2001 | Jensenworth et al. | 726/10 |
| 7,386,131 | B2* | 6/2008 | Jing et al. | 380/278 |
| 7,734,912 | B2* | 6/2010 | Ganesan et al. | 713/155 |
| 8,032,744 | B2* | 10/2011 | Doonan et al. | 713/156 |
| 8,259,947 | B2* | 9/2012 | Rose et al. | 380/277 |
| 2003/0056099 | A1 | 3/2003 | Asanoma et al. | |
| 2004/0006701 | A1* | 1/2004 | Kresina et al. | 713/189 |
| 2004/0218763 | A1* | 11/2004 | Rose et al. | 380/277 |

FOREIGN PATENT DOCUMENTS

| | | |
|---|---|---|
| JP | 2001507528 | 6/2001 |
| JP | 2003092565 A | 3/2003 |
| JP | 2003348065 A | 12/2003 |
| JP | 2005045622 | 2/2005 |
| JP | 2005278065 A | 10/2005 |
| JP | 2007507778 T | 3/2007 |
| WO | 9718655 A1 | 5/1997 |

OTHER PUBLICATIONS

Ruidong Li et al: "Localized public-key management for mobile ad hoc networks", Global Telecommunications Conference, 2004. GLOBECOM '04. IEEE Dallas, TX. USA Nov. 29-Dec. 3, 2004, Piscataway, NJ, USA, IEEE, Nov. 29, 2004, pp. 1284-1289, XP010757120.
International Search Report—PCT/US06/061955, International Search Authority—European Patent Office—Mar. 4, 2008.
Taiwanese Search report—095146495—TIPO—Jul. 31, 2010.
Written Opinion—PCT/US2006/061955, International Search Authority, European Patent Office, Mar. 4, 2008.

* cited by examiner

CERTIFY AND SPLIT SYSTEM AND METHOD FOR REPLACING CRYPTOGRAPHIC KEYS

CLAIM OF PRIORITY UNDER 35 U.S.C. §119

The present Application for Patent claims priority to U.S. Provisional Application No. 60/749,718 entitled "Certify and Split System and Method for Replacing Cryptographic Keys" filed Dec. 12, 2005 and assigned to the assignee hereof and hereby expressly incorporated by reference herein.

BACKGROUND

1. Field

The following description relates generally to data protection and more particularly to replacing keys in a cryptographic system.

2. Background

Persons who intend to maliciously alter and/or use data for their own purposes can intercept information transmitted digitally. As such, digitally transmitted information is often cryptographically authenticated to ensure the information sent arrives at its destination in a substantially similar form as it was sent and also to verify and/or identify the originator.

Public-key cryptography systems are implemented in devices, including portable devices, for data security and provide cryptographic signatures. Public-key or asymmetric cryptography systems typically provide a user with a private key and a public key for authentication purposes. Generally, the public key is shared with others while the private key is kept private or secret to the user. That is, the private key remains in the device and the public key is sent to one or more targeted entries. In this way, the device may be used by the owner to establish relationships with the targeted entities, providing the owner access to secured items, including doors, bank accounts, computer networks, etc.

A device and a private key stored in the device, might be stolen, lost, broken, destroyed, or otherwise in need of replacement. In the case of theft, the owner of the device needs to mitigate an amount of damage the thief can cause by such thief having possession of the device. Generally, when an owner desires to replace the device, the owner authenticates a key of a new token by way of utilizing a key of an old token. This method suffers from the drawback that it requires the owner to have both the old token (old private and public key pair) and the new token (new private and public key pair) at the same time, which is not possible if the device is stolen, or damaged beyond use.

SUMMARY

The following presents a simplified summary of one or more examples and configurations in order to provide a basic understanding of some aspects of such examples and configurations. This summary is not an extensive overview of the one or more configurations, and is intended to neither identify key or critical elements of the embodiments nor delineate the scope of such configurations. One purpose is to present some concepts of the described configurations in a simplified form as a prelude to the more detailed description that is presented later.

A method operational on a token device is provided for replacing assymetric cryptographic keys. A pseudorandom first key pair is obtained that comprises a first private key and a corresponding first public key. A pseudorandom spare second key pair is obtained that comprises a second private key and a second public key. The second public key is signed with the first private key to obtain a signed certificate. The second key pair and signed certificate is divided into n shares, where n is an integer. The n shares are then distributed to at least two shareholders for safekeeping.

To replace the first key pair with the second key pair, at least a portion of the n shares are retrieved from the at least two shareholders. The second key pair and signed certificate are reconstructed from at least a portion of the n shares retrieved. The signed certificate is presented to a verification device to replace the first public key with the second public key. The second key pair and signed certificate into shares is determined by a secret sharing scheme.

The signed certificate may also be distributed to an authentication device to replace the first public key with the second public key and invalidate the first key pair upon authentication of the second key pair.

Additionally, a third key pair is obtained or created when replacing the first key with the second key, the third key pair comprising a third public key and a third private key. The third public key may be signed with the second private key to obtain a second signed certificate. The third key pair and second signed certificate may then be divided into n shares, where n is an integer. The n shares associated with the third key pair are then distributed to at least two shareholders for safekeeping.

To replace the second key pair with a third key pair, at least a portion of the n shares associated with the third key pair are retrieved. The third key pair is recreated from the at least a portion of n shares retrieved. The second signed certificate is presented to a verification device to replace the second public key with the third public key. A trust level of the first key pair may be associated with a trust level for the second key pair.

Another feature provides for a duplicate key pair. A duplicate key pair of the first key pair is created. A set of use rules may be associated with the duplicate key pair The duplicate key pair and use rules may then be distributed to a second token device. The duplicate key pair may also be invalidated according to use rules.

Another feature provides a token device that facilitates replacing cryptographic keys. The token device may include a key assignment component and a distribution component. The key assignment component may be configured to (1) obtain a pseudorandom first key pair that comprises a first private key and a corresponding first public key, (2) obtain a pseudorandom spare second key pair that comprises a second private key and a second public key, and (3) sign the second public key with the first private key to obtain a signed certificate. The distribution component may be configured to divide the second key pair and signed certificate into n shares, where n is an integer. A transmitter may allow the distribution component to distribute the n shares to at least two shareholders for safekeeping.

The token device may also include a key verification component that comprises (a) a receiver that receives at least a portion of the n shares from the at least two shareholders, (b) an aggregation component that reconstructs the second key pair and signed certificate from the at least a portion of the n shares received, and/or (c) a transmitter that sends the signed certificate to a verification device to replace the first public key with the second public key. The key verification component may also be configured to authenticate the second key pair and invalidate the first key pair upon authentication of the second key pair. A third key pair may be obtained when replacing the first key with the second key, the third key pair comprising a third public key and a third private key. The key verification component is further configured to distribute the signed certificate to an authentication device to replace the first public key with the second public key and invalidate the first key pair upon authentication of the second key pair.

The key assignment component may also be configured to (a) create a duplicate key pair of the first key pair, (b) associate a set of use rules with the duplicate key pair, (c) distribute the duplicate key pair and use rules to a second token device, and/or (d) invalidate the duplicate key pair according to use rules.

A machine-readable medium is also provided having one or more instructions for replacing cryptographic keys, which when executed by a processor causes the processor to: (a) obtain a pseudorandom first key pair that comprises a first private key and a corresponding first public key, (b) obtain a pseudorandom spare second key pair that comprises a second private key and a second public key, (c) sign the second public key with the first private key to obtain a signed certificate, (d) divide the second key pair and signed certificate into n shares, where n is an integer, and/or (e) distribute the n shares to at least two shareholders for safekeeping. The machine-readable medium may further include one or more instructions which when executed by a processor causes the processor to further (a) retrieve at least a portion of the n shares from the at least two shareholders, (b) reconstruct the second key pair and signed certificate from the at least a portion of the n shares retrieved, (c) present the signed certificate to a verification device to replace the first public key with the second public key, (d) authenticate the second key pair and invalidate the first key pair upon authentication of the second key pair, and/or (e) distribute the signed certificate to an authentication device to replace the first public key with the second public key and invalidate the first key pair upon authentication of the second key pair. The machine-readable medium may further include one or more instructions which when executed by a processor causes the processor to further: (a) create a duplicate key pair of the first key pair, (b) associate a set of use rules with the duplicate key pair, and/or (c) distribute the duplicate key pair and use rules to a duplicate user device.

A method operational on an authentication device is also provided for replacing an asymmetric cryptographic keys. A first public key associated with a user is obtained, the first public key having an associated first private key. A digital certificate of a second public key digitally signed with the first private key is received. The user may be authenticated by using the first public key to authenticate the digital certificate. The first public key is replaced with the second public key to secure communications with the user if the digital certificate is successfully authenticated. One or more other intervening digital certificates are received that create an authentication chain between the first public key and the second public key. Each intervening digital certificate is authenticated to determine whether the first public key should be replaced by the second public key. The second public key may be rejected if the digital certificate authentication by the first public key fails.

An authentication device is also provided comprising a communication module and a processing circuit. The communication module may be configured to (a) receive a first public key associated with a user, the first public key having an associated first private key, and (b) receive a digital certificate of a second public key digitally signed with the first private key. The processing circuit may be configured to (a) authenticate the user by using the first public key to authenticate the digital certificate, and (b) replace the first public key with the second public key to secure communications with the user if the digital certificate is successfully authenticated. The communication module may also be configured to receive one or more other intervening digital certificates that create an authentication chain between the first public key and the second public key. The processing circuit may also be configured to (a) authenticate each intervening digital certificate to determine whether the first public key should be replaced by the second public key, and/or (b) reject the second public key if the digital certificate authentication by the first public key fails.

A machine-readable medium is also provided having one or more instructions for replacing a cryptographic keys, which when executed by a processor causes the processor to: (a) obtain a first public key associated with a user, the first public key having an associated first private key, (b) receive a digital certificate of a second public key digitally signed with the first private key, (c) authenticate the user by using the first public key to authenticate the digital certificate, (d) replace the first public key with the second public key to secure communications with the user if the digital certificate is successfully authenticated, (e) receive one or more other intervening digital certificates that create an authentication chain between the first public key and the second public key, and/or (f) authenticate each intervening digital certificate to determine whether the first public key should be replaced by the second public key.

To the accomplishment of the foregoing and related ends, one or more examples and configurations comprise the features hereinafter fully described and particularly pointed out in the claims. The following description and the annexed drawings set forth in detail certain illustrative aspects of the one or more examples and/or configurations. These aspects are indicative, however, of but a few of the various ways in which the principles of various configurations may be employed and the described examples and/or configurations are intended to include all such aspects and their equivalents.

DETAILED DESCRIPTION

Various examples and configurations are now described with reference to the drawings. In the following description, for purposes of explanation, numerous specific details are set forth in order to provide a thorough understanding of one or more aspects. It may be evident, however, that such configuration(s) may be practiced without these specific details. In other instances, well-known structures and devices are shown in block diagram form in order to facilitate describing these configurations.

As used in this application, the terms "component," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

One feature provides a cryptographic method for replacing a first private-public key pair (often referred to as asymmetric key encryption and public key encryption) with a pre-generated and signed spare second private-public key pair. The spare second key pair and a certificate signed within the first private key are split into multiple shares and stored with a plurality of shareholders. The signed certificate may be may a second public key (of the spare second key pair) that is digitally signed by the first private key. To replace the first private-public key pair, the spare second key pair shares are recalled from the plurality of shareholders. The second public key portion of the spare second key pair, signed by the first private key, is presented to client devices for authentication. By using the first private key, the client devices may authenticate the signed certificate and, therefore, the second public key. The client devices may then discard or invalidate the original first public key from the first private-public key pair.

Figure 1:
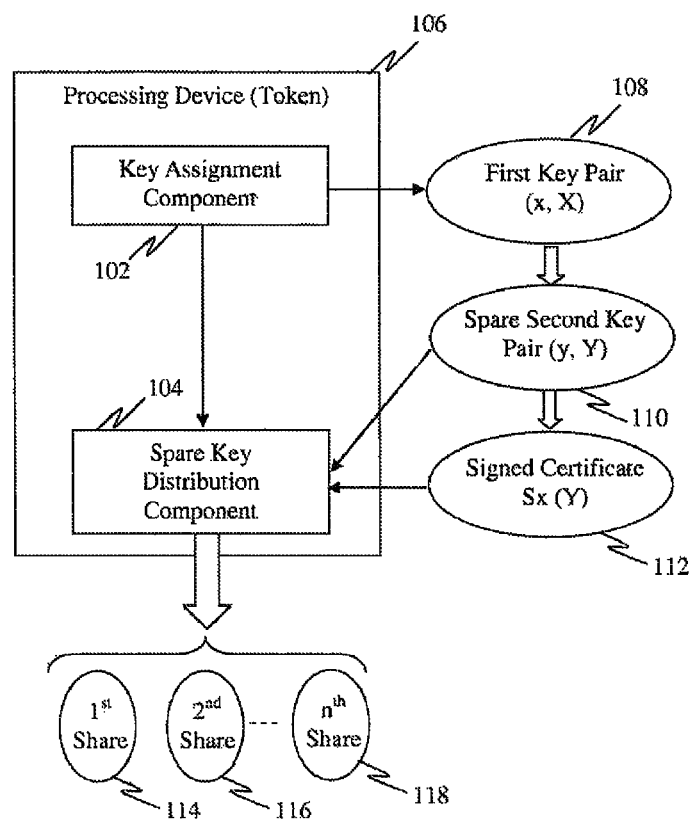
FIG. 1 illustrates a high-level block diagram of a processing device configured to facilitate replacement of cryptographic keys.

FIG. 1 illustrates a high-level block diagram of a processing device configured to facilitate replacement of cryptographic keys. Cryptographic keys are often used to protect data and communications and are employed to allow a message, data, a packet of information, etc., to be communicated without such message, data, or packet being read and understood by someone other than the intended recipient. In asymmetric encryption systems, a "public key" is a publishable portion of a private-public key pair while a "private key" is a secret (private) portion of the private-public key. Both the public key and/or private key may be used to verify signatures. A digital signature is a unique digest of a block of data to be signed and is computed using a private key of the signer. Digital signatures are employed to verify that a message, data, or a packet of information was authorized by a certain person, and was not altered or modified by anyone else. This process is commonly referred to as "authentication."

The processing device 106 includes a key assignment component 102 that interfaces with a spare key distribution component 104. The processing device 106 (hereinafter also referred to as a "token") may be a portable phone, a personal data assistant, a computer, a processor, or other electronic devices where transfer of secure data through cryptographic method(s) is utilized. The key assignment component 102 facilitates creating a first key pair (x, X) 108 (i.e., a first private key x and corresponding first public key X). The private key x of the first key pair (x, X) 108 may reside in token 106 may be used to authenticate communications to/from token 106, and may include an associated trust level.

Key assignment component 102 further creates a spare second key pair (y, Y) 110 (e.g., a second private key y and corresponding second public key Y), associated with first key pair (x, X) 108. The generation of the spare second key pair (y, Y) 110 may be automatic, whereby token 106 automatically generates the spare second key pair (y, Y) 110 if one has not yet been created or it may be generated through a manual action whereby an owner initiates the creation of spare key pair (y, Y) 110 through a request.

In an alternative configuration, the key assignment component 102 may receive the first key pair 108 from an external source and generate the spare second key pair 110 and signed certificate 112.

Spare second key pair (y, Y) 110 is created for a future use, for example, if token 106 is lost, stolen, broken, or if an owner wants to replace the first key pair (x, X) for security reasons. Second key pair 110 is then used with a new token to associate the owner of the new token and that owner's credentials with the previous or old token and associated first key pair (x, X) 108. This may simplify the process whereby an owner can reestablish relationships with targeted entities through a new token based upon the relationships previously established through an old token.

An association between first key pair (x, X) 108 and second key pair (y, Y) 110 is established by signing the spare second public key Y with the first private key x. The second key pair (y, Y) 110 is generated while the owner is still in possession of the first token ("active token") having the associated first key pair (x, X). Key assigment component 102 may be configured to generate or assign the new pseudorandom spare second key pair (y, Y). A signed certificate Sx(Y) 112 may also be generated by signing the second public key Y with the first public key x. Thus, a new authentication key is generated comprising the spare second key pair (y, Y) 110 and signed certificate Sx(Y) 112, $$(y,Y),\text{Sig}_x(Y).$$

To generate the signed certificate Sx(Y) 112, key assignment component 102 may digitally sign the second public key Y with the first private key x using a suitable digital signature algorithm. One example of a digital signature algorithm that employs private and public keys is the Digital Signature Standard (DSS), which is defined in the FIPS (Federal Information Processing Standard) publications 180 and 186. The DSS is essentially a pair of large numbers that are computed according to a specified algorithm and within determined parameters. The DSS certifies authentication of the signature and integrity of the attached data. While some examples herein are described in terms of the DSS, other digital signature schemes may be used for the same purpose within this disclosure, and are not limited to a particular type of digital signature.

Since the second key pair (y, Y) 110 is public key-based, it may be authenticated to a plurality of authenticators or verifier devices that receive communications from tokens and verify that the information is authentic. This is possible even when there is no public key infrastructure in place or where the authenticators trust some certificate of authority. The authenticators do not necessarily have to trust each other, provided they have a public key to authenticate the signed certificate.

Once second key pair (y, Y) 110 is generated by assignment component 102 and second public key Y is signed by the first private key x, spare key distribution component 104 divides or splits the second key pair (y, Y) 110, along with its associated signed certificate Sx(Y) 112, into a plurality of n shares 114, 116, and 118. Spare key distribution component 104 may divide the second key pair (y, Y) 110 and signed certificate Sx(Y) 112 into a number of shares, n shares, where n is an integer. Each n share may be of similar size or of different sizes.

After dividing second key pair (y, Y) 110 and certificate Sx(Y) 112 into a plurality of shares 114, 116, and 118, key distribution component 104 may distribute the shares among holders ("shareholders"). The shareholders may be trustworthy and can include, for example, the owner of the user device, a trusted co-worker, and/or friend of the owner, financial institutions, or third parties, such as cellular telephone service providers. Various algorithms, methods, and/or techniques may be employed to determine trustworthiness of a potential shareholder.

The purpose of dividing the spare second key pair (y, Y) 110 and signed certificate Sx(Y) 112 into n shares is to ensure that no one shareholder can reconstruct the key. This is to prevent a situation where a shareholder, who is unreliable or was previously reliable and has become unreliable, is able to reconstruct the key for malicious or unauthorized purposes. If this untrustworthy shareholder had been entrusted with the entire key, that untrustworthy shareholder could literally step into the shoes of the authentic key holder or owner. The untrustworthy shareholder could then maliciously communicate data, leading a recipient of that data to reliably believe the untrustworthy shareholder is actually the authentic key holder. By only allowing each shareholder to have a portion of the key, individual shareholders do not have enough information to reconstruct the key without collusion from one or more other shareholder(s).

Spare second key pair 110 may have a trust level associated with it that is comparable to a trust level of first key pair 108 that signed second key 110. In this way, if the token that uses first key pair 108 is compromised (e.g., stolen, lost, . . . ) the owner can register a new token with the spare second key pair 110 and the new token may be authenticated or verified as belonging to that owner. Thus, replacement of a token is simplified while maintaining confidentiality of both the private key associated with the first token and the private key associated with the second token.

By creating second spare key pair 110 as a pseudorandom number and outputting similar portions to trustworthy shareholders, the necessity of storing the second key pair 110 on the active token itself is mitigated. Thus, second key pair 110 may be created in anticipation of possibly needing a new token in the future, even before the owner has possession of the new token. It is also contemplated that second key pair 110 may never be needed by the user, thus the shares 114, 116, and 118 may remain at the shareholders in an inactive state.

Token 106 may not be limited to creating only a second cryptographic key pair 110 and is capable of creating a multitude of new spare keys, such as a second key pair, a third key pair, etc. Each subsequent key pair is signed by the previous key pair and may be signed by the previous key pairs in the chain. For example, if spare second key pair (y, Y) replaces the first key pair (x, X) as the active key pair for authentication purposes, a spare third key pair (z, Z) is generated. A new signed certificate Sy(Z) is generated by signing the third public key Z with the second private key y. The new signed certificate Sy(Z) and third key pair (z, Z) are then split into multiple shares and distributed among multiple shareholders.

This process may be repeated as an active key pair is replaced by a spare key pair. In various configurations, the spare key pair may be generated concurrent with or after the first key pair.

In alternate configurations, a plurality of spare key pairs may be generated. Each key pair may have an associated signed certificate where its public key is signed by the private key of a preceding key pair. The plurality of spare key pairs and their signed certificates may then be split and distributed to a plurality of shareholders. In this manner, a current key pair may be replaced by one of a plurality of chained or sequential spare key pairs.

Authentication of each subsequent or spare key pair may be determined by an authentication or verifier device. For example, a verifier device can set rules that allow the existence of only one new/replacement key pair to be associated with a first key pair. Thus, for example, a second key pair (i.e., spare key pair) is created and signed by a first key pair. Then a third key pair (i.e., additional spare key pair) is created and signed by the second key pair and/or the first key pair. When a user associates a token with the third key pair and requests authentication from a verifier device, the verifier device can authenticate the third key pair while invalidating the first and second key pairs at a substantially similar time. This invalidation can occur even if the second key pair was never authenticated. In this way, when a subsequent key pair is authenticated, a previously generated subsequent key pair may be invalidated, disregarded, and/or destroyed. These rules may be set individually for each token and/or verifier device. For example, in another configuration more than one key pair, signed by preceding key pair(s), may be authenticated as duplicate key pairs.

Figure 2:
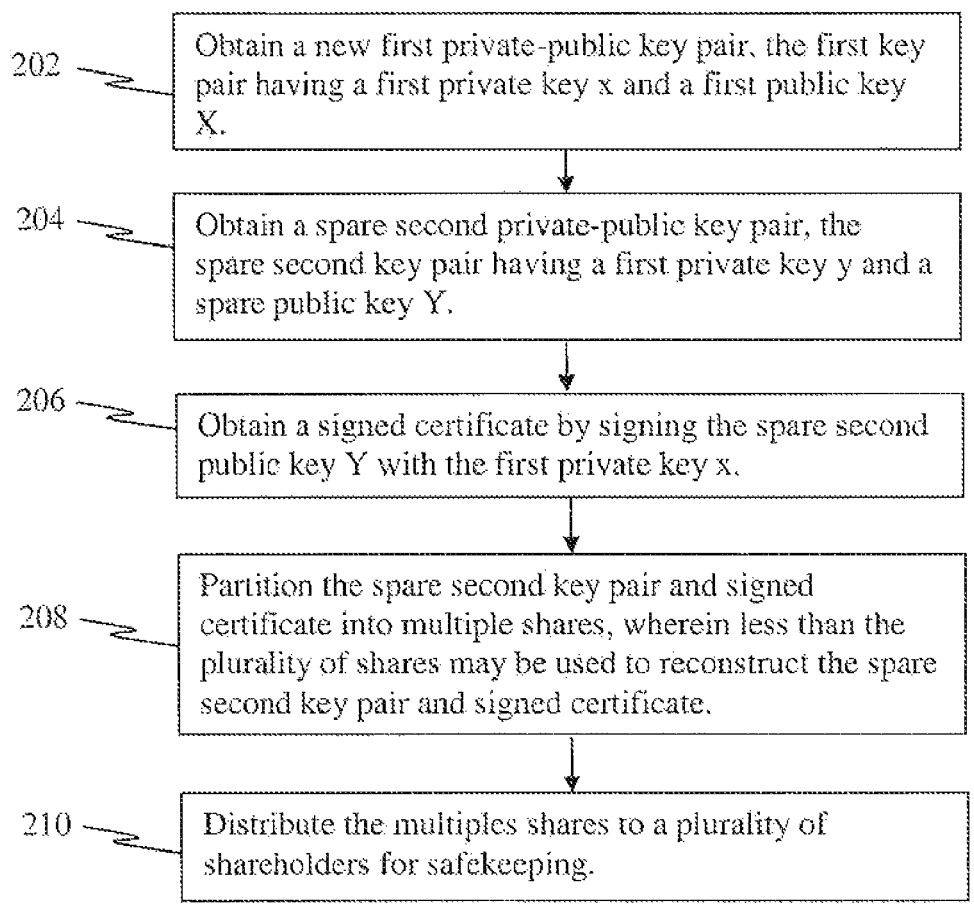
FIG. 2 illustrates a method for cryptographic key replacement according to one example.

FIG. 2 illustrates a method for cryptographic key replacement according to one example. In one example, this method may be partially or fully operational on a processing device or token. A first private-public key pair is obtained or pseudo-randomly generated, wherein the first key pair has a first private key x and a first public key X 202. The first key pair may be used in asymmetric encryption system. The first key pair may have a trust level associated with it and this trust level is communicated to and/or received from a verification device. The private key x of the first key pair is maintained or stored on a user device.

A spare second private-public key pair is obtained or pseudorandomly generated concurrent with, or subsequent to, the first key pair, wherein the spare second key pair has a second private key y and a second public key Y 204. In this way, the spare key pair is associated with the first key pair without compromising either the first key pair or the spare second key pair and without requiring the spare second key pair to be stored on a user device. The creation of the spare second key pair may be performed autonomously when a first key pair is associated with a token, for example. The spare second key pair can also be created upon a prompt from the token owner requesting creation of a spare (third, fourth, fifth, . . . ) replacement or duplicate key pair.

A signed certificate is obtained or generated by signing the spare second public key Y with the first private key x 206. The spare second key pair and signed certificate are partitioned into multiple shares, wherein less than the plurality of shares may be used to reconstruct the second key pair and signed certificate 208. The second key pair may be split according to a sharing scheme. The n shares may be distributed to at least two trusty shareholders. Various algorithms, methods, and/or techniques may be employed to determine trustworthiness of a potential shareholder. By way of illustration, each shareholder can receive an individual divided share of the second key pair. That is, each n share is distributed to a different shareholder, and no shareholder has more than one share. Additionally, that one share is not substantive enough to allow the shareholder to reconstruct the second key pair without obtaining additional shares from other shareholders. In this way, unauthorized use and authentication of a key pair is mitigated. The distributed portions of the second key pair remain distributed at respective shareholders until such time as the owner requests the second key pair be recreated for use in a new and/or duplicate token.

The multiple shares may be distributed to a plurality of shareholders for storage or safekeeping 210.

Figure 3:
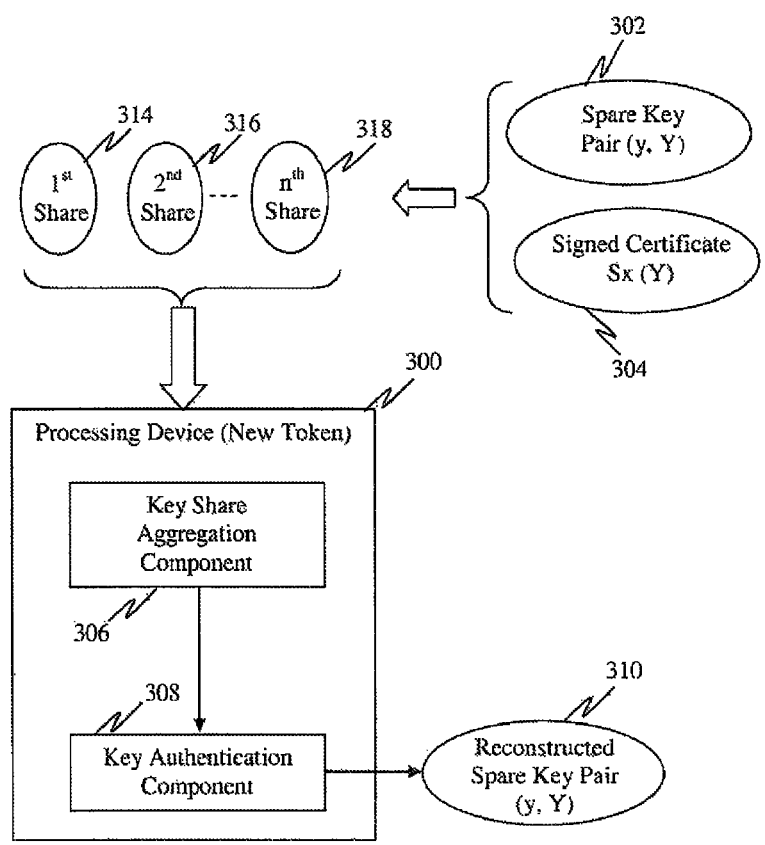
FIG. 3 is a block diagram of a processing device configured to assemble and authenticate a spare cryptographic key pair.

FIG. 3 is a block diagram of a processing device configured to assemble and authenticate a spare cryptographic key pair. Processing device 300 (also referred to as the new token) includes a key share aggregation component 306, and a key authentication component 308. When an owner desires to authenticate the new token 300 with a previously generated spare key pair 302, it sends a request to retrieve n shares of the spare key pair 302 that were previously distributed to a plurality of shareholders.

Not every share of the n shares 314, 316, and 318 needs to be received in order to reconstruct the spare key pair 302, provided there are a sufficient number of n, shares received to recreate the spare key pair 302. The number of shares that is sufficient to recreate spare key pair 302 is represented as k number of shares, where k is an integer. Typically the k number of shares necessary to recreate the key is a number smaller than n, represented as (k<n). The determination of the number of shares necessary to recreate the spare key pair is performed through a sharing scheme, such as Shamir's secret sharing scheme, for example. It is to be appreciated that any suitable sharing scheme may be utilized and all such schemes are applicable to the configurations shown herein.

When the shares are received by processing device 300, key share aggregation component 306 that confirms the appropriate number of shares, k, is received. Once the k shares are received, key share aggregation component 306 compiles the k shares to recreate spare key pair 310.

Key authentication component 308 receives the recreated spare key pair and analyzes it to certify if it is authentic and determines its associated trust or security level. The spare key pair may have been digitally signed with a first key pair to obtain a signed certificate 304. Since the spare key pair 302 was digitally signed with the first key pair, which had a known trust level, the spare key pair 302 has a trust level associated with it based upon the trust level of the first key pair. Thus, the owner in possession of a new token 300 is capable of authenticating that new token 300 without having possession of both the new and old (previously active) token at a substantially similar time, provided the owner had a spare key pair 302 created that was signed with the first key pair. For example, the signed certificate 304 may have been generated by digitally signing the spare public key Y with a private key x (belonging to the first key pair).

Figure 4:
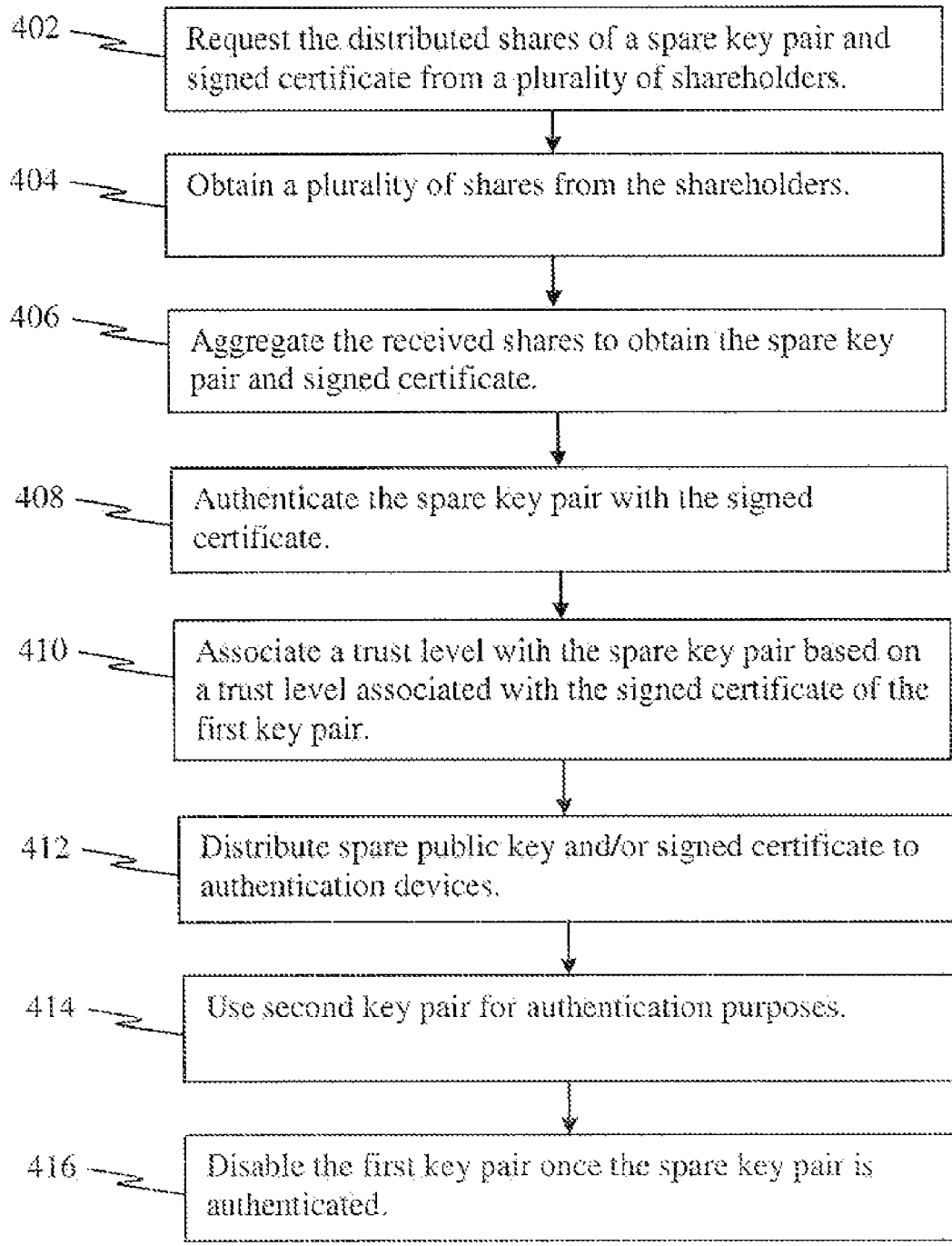
FIG. 4 illustrates a method for aggregating and authenticating a spare key pair according to one example.

FIG. 4 illustrates a method for aggregating and authenticating a spare key pair according to one example. The distributed shares of a spare key pair and a signed certificate are requested from a plurality of shareholders 402. A plurality of k shares is obtained from the shareholders 404. The plurality of k shares is a subset of a total of n shares previously distributed that should be retrieved to reconstruct or recreate the spare key pair. The number of k shares necessary may be determined based upon a sharing scheme. One commonly utilized scheme is Shamir's secret sharing scheme. However, it is to be appreciated that a plurality of sharing schemes may be employed and all such schemes are equally applicable to the one or more configurations disclosed herein.

The received shares are aggregated to obtain the spare key pair and signed certificate 406. The spare key pair is authenticated with the signed certificate 408. A trust level is associated with the spare key pair based on a trust level associated with the signed certificate of the first key pair 410. This trust level may be determined based upon the signature of the public key portion o the spare key pair. Since the spare public key portion was previously signed by a private key portion of the first key pair, the spare key pair may have the same or similar authentication as the first key pair.

The spare public key of the spare key pair may then be distributed to verification devices 412. The spare key pair may then be used for authentication purposes 414. The first key pair is then disabled once the spare key pair is authenticated 416. That is, when the spare key pair is authenticated, the first key pair, is disabled, invalidated, destroyed, and/or associated with an invalid authentication. The invalidation of the first key pair may be optional. In certain configurations, the first key pair can remain active allowing the spare key pair to be a duplicate key pair associated with the first key pair and available for use at a substantially similar time as the first key pair. If such duplication is authorized, the creation of a duplicate key pair is associated with rules established, for example, by a verification device.

For example, in the case of an ATM machine at a bank, a verification device (bank) may not allow more than one ATM card to be associated with a particular user. The concern here would be to mitigate fraud on both the bank and the account owner. Thus, a duplicate key pair will not be created because the rules associated with the bank do not allow for such duplication. In other applications, such as a security system, for example, a duplicate key may be acceptable, allowing to an alternate user to have authentication at a substantially similar time as the original owner. Rules are associated with the spare or duplicate key that establish how/when the duplicate token (and associated key pair) may be used. The spare key pair is used for authentication purposes until such time as the spare key pair is invalidated. A third, fourth, fifth . . . key may be authenticated using a similar method.

Figure 5:
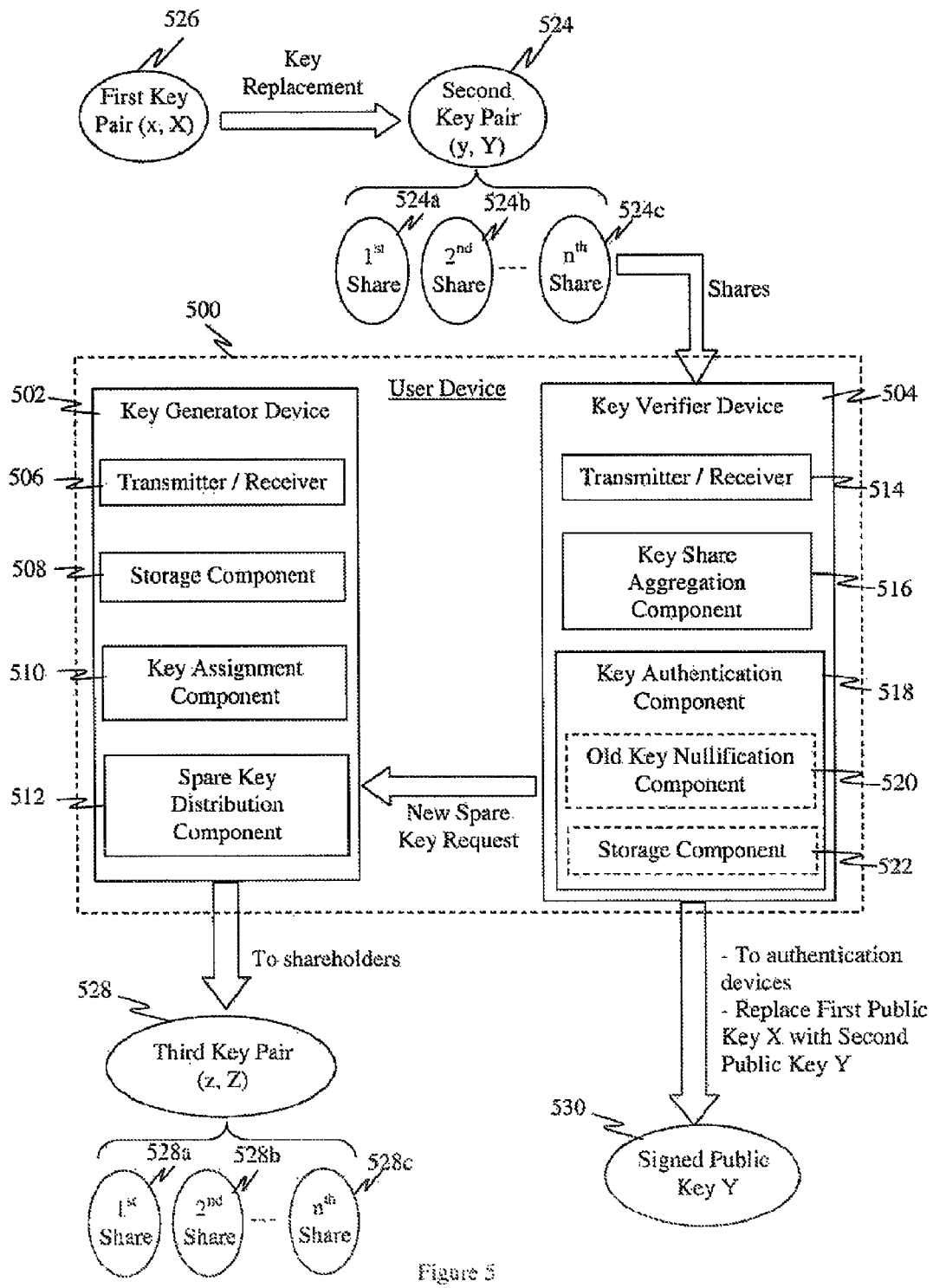
FIG. 5 illustrates a scheme for replacing cryptographic keys between a user device or token and a verification or authentication device according to one example.

FIG. 5 illustrates a device for generating and authenticating replacement cryptographic keys. The key generating functions may be performed by a key generator device 502 and key verification or authentication functions may be performed by a key verifier device 504 according to one example. Key generator device 502 may include a transmitter/receiver 506, a storage component 508, a key assignment component 510, and a spare key distribution component 512. Key verifier device 504 may include a transmitter/receiver 514, aggregation component 516, and a key authentication component 518. In various configurations, the key generator device 502 and key verifier device 504 may be separate devices or combined into a single device. For purposes of this example, the key generator device 502 and key verifier device 504 are part of a user device 500.

When an owner, who previously created a second key pair 524, acquires a new user device 500, the owner attempts to register or authenticate new user device 500 using the second key pair 524. That is, the owner attempts to replace a previous first key pair (x, X) with a second key pair (y, Y) 524. In this example, first key pair (x, X) 526 includes a private key x and a public key X, and a second key pair (y, Y) 524 includes a private key y and a public key Y. A signal from the key verifier device 504 is sent through the transmitter/receiver 514 to retrieve at least k shares of the second key pair 524 from a plurality of shareholders who each have a portion of the second key pair 524. The k shares are the number of shares sufficient to recreate the second key pair 524, generally a percentage or subset of the total number of shares disbursed to the plurality of shareholders. Additionally, the requested shares may also include a signed certificate of the second public key Y signed by the first private key x.

As each of the k shares is received (or after the sufficient amount of shares is received), by key verifier device 504, the shares are aggregated by key share aggregation component 516. The number of k shares necessary to recreate second key pair 524 is determined by a sharing scheme system. By way of illustration, spare key distribution component 512 on key generator device 502 may divide a new spare key into three shares, for example. Through transmitter/receiver 506 each of the three shares is output individually to one or three shareholders, each shareholder only receiving one of the shares. When the new spare key is to be recreated, a signal is sent through transmitter/receiver 514 to retrieve a percentage or all of the n shares. Aggregation component 516 receives k number of the n shares to recreate the new key pair, where k represents an integer less than n(k<n).

Thus, if for example n=3, then two of the three shares can recreate the second key pair 524. This ensures that one shareholder, by itself, is not able to recreate the second key pair 524 and mitigates the chance that an untrustworthy shareholder, or a shareholder who at one time was trustworthy but is now corrupt, can recreate the second key pair 524 and breach the trust associated with that second key pair 524. This sharing scheme also provides for the case where one shareholder loses its individual portion/share or is no longer accessible. While three shares are utilized for illustration purposes, second key pair 524, and subsequent key pairs (e.g., third key pair, fourth key pair, etc.) may be split into a number of shares as determined by rules which may be established by the key generator device 502 and/or the key verifier device 504.

The reconstructed second key pair 524 is authenticated by authentication component 518 that can include a nullification component 520 and a storage component 522. When recreated second key pair 524 is authenticated, nullification component 520 can invalidate or nullify first key pair 526, rendering it no longer valid, ensuring that first key pair 526 is no longer usable by anyone who can obtain unauthorized access to first key pair 526, or who can subsequently acquire access to first key pair 526. The invalidation of first key pair 526 is optional and other implementations may provide for the continued use of the first key pair 526 at a substantially similar time as a second key pair, third key pair, fourth key pair, etc. A notification that the first key pair 526 is invalidated may be sent to the user device 502.

Storage component 522 may store information regarding first key pair 526 to prove that it can no longer be used. By nullifying first key pair 526, a user who is in unauthorized possession of it, such as through deceit, can no longer use the first key pair 526. Additionally, if second key pair 524 is the one that is compromised and the party that compromised it authenticates it with key verifier device 504, first key pair 526, still in possession of the true owner, becomes invalidated. Thus, the true owner, who is still using the first key pair 526, is notified at a substantially similar time as when the breaching party authenticates second key pair 524. This is because first key pair 526 becomes inactive at a similar time as second key pair 524 is activated and the true owner can no longer authenticate first key pair 526 with verification device 504. When this happens, the true owner can take measures to retrieve and/or invalidate second key pair 524 that has been breached, thus mitigating potential further damage caused by the breach.

After key authentication component 518 authenticates second key pair 524, the key verifier device 504 communicates to key generator device 502, through respective transmitter/receivers 506 and 514, a notification of the authentication of the new key pair. Key generator device 502 may retain second key pair 524 (now the active key pair) in storage component 508. Key generator device 502 either autonomously upon receiving the recreated second key pair 524, or through a user prompt, creates a spare third key pair 528, for future use, based on the now active second key pair 524 just received. Third key pair 528 is generated using key assignment component 510 and spare key distribution component 512 that splits third key pair 528 into n shares and transmits the n shares to n shareholders. Third key pair 528 is then available for future retrieval if/when the second key pair 524 is replaced.

Key verifier device 504 may also distribute the signed certificate 530 of the second public key Y signed by the first private key x to other users. The users may utilize this certificate to authenticate the new public key Y and replace the previous public key X for purposes of authenticating user device 500.

Figure 6:
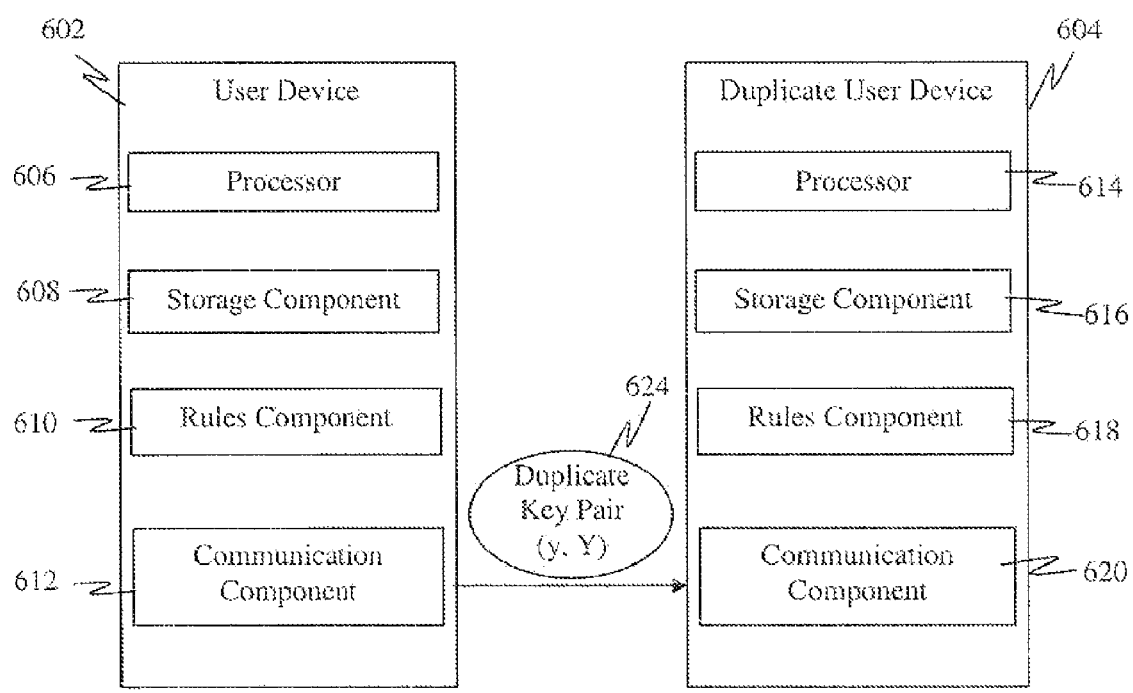
FIG. 6 illustrates a scheme for creating a second cryptographic key pair that is used at a substantially similar time as a first cryptographic key pair.

FIG. 6 illustrates a scheme for creating a second cryptographic key pair that is used at a substantially similar time as a first cryptographic key pair. There may be situations where an owner of a token desires another user to have the same and/or modified authentication levels as that owner. By way of illustration and not limitation, an owner may have a token that provides access to the owner's home through a home security system. If such owner has a need for someone else, such as a house cleaning service or pet walking service, to access to the house at predetermined times, such owner can create a duplicate token and associated key pair for the other person's use in order to gain access to the house.

The concurrent use of related cryptographic keys may be implemented between a user device 602 and a duplicate user 604. User devices 602 and 604 may be implemented in a token, a portable phone, a personal data assistant, a personal computer, or other electronic devices. Both user devices 602 and 604 include respective processors 606 and 614 that generate and manipulate cryptographic keys. Also included on user devices 602 and 604 are storage components 608 and 616 that store the generated cryptographic keys, rules components 610 and 618 that associate rules with the respective user devices 602 and 604 (and associated key pairs), and communication components 612 and 620 that facilitate communication between user devices 602 and 604 and/or authentication devices (not shown).

In one example, user device 602 may use a first key pair for cryptographic and/or authentication operations. The owner in possession of user device 602 creates a duplicate key pair 624 by utilizing the processor 606, for example. For instance, the duplicate key pair 624 may be a duplicate of the first key pair. Duplicate key pair 624 can either be stored on a storage component 608 of the user device 602 or output to shareholders. Duplicate key pair 624 may have rules associated with it as directed or created by a rules component 610. Rules component 610 may authorize duplicate user device 604 rules that allow accessibility or authentication for specified predefined times, days, and/or length of time. The duplicate key pair 624 may have the same or different rules as the first key pair from which it is generated. For example, if duplicate user device 604 is only to be used for seven days, rules component 610 can provide a start and end time during which duplicate user device 604 (and associated key pair) is to remain active or authenticated. The start and end time may be calendar days or based on other means of computation and/or tracking. Once the defined period expires, duplicate user device 604 (and associated key pair 624) is rendered inactive. Future authentication attempts using duplicate key pair 624 will be returned by an authentication device (not shown) as inactive or invalid. In such a manner, user device 602 may be used at substantially the same time that duplicate user device 604 is used.

User device 602 may communicate directly with duplicate user device 604 through communication components 612 and 620 or through shareholders. Duplicate user device 604 has a rules component 618 that retrieves the rules associated with the duplicate key 624 and applies these rules to the duplicate user device 604. Duplicate user device 604 has a storage component 616 that stores the private portion of the duplicate key pair 624 and a processor 614 that processes information associated with the duplicate key pair 624. In this manner, duplicate user device 604 may obtain the duplicate key pair (y, Y) 624.

Figure 7:
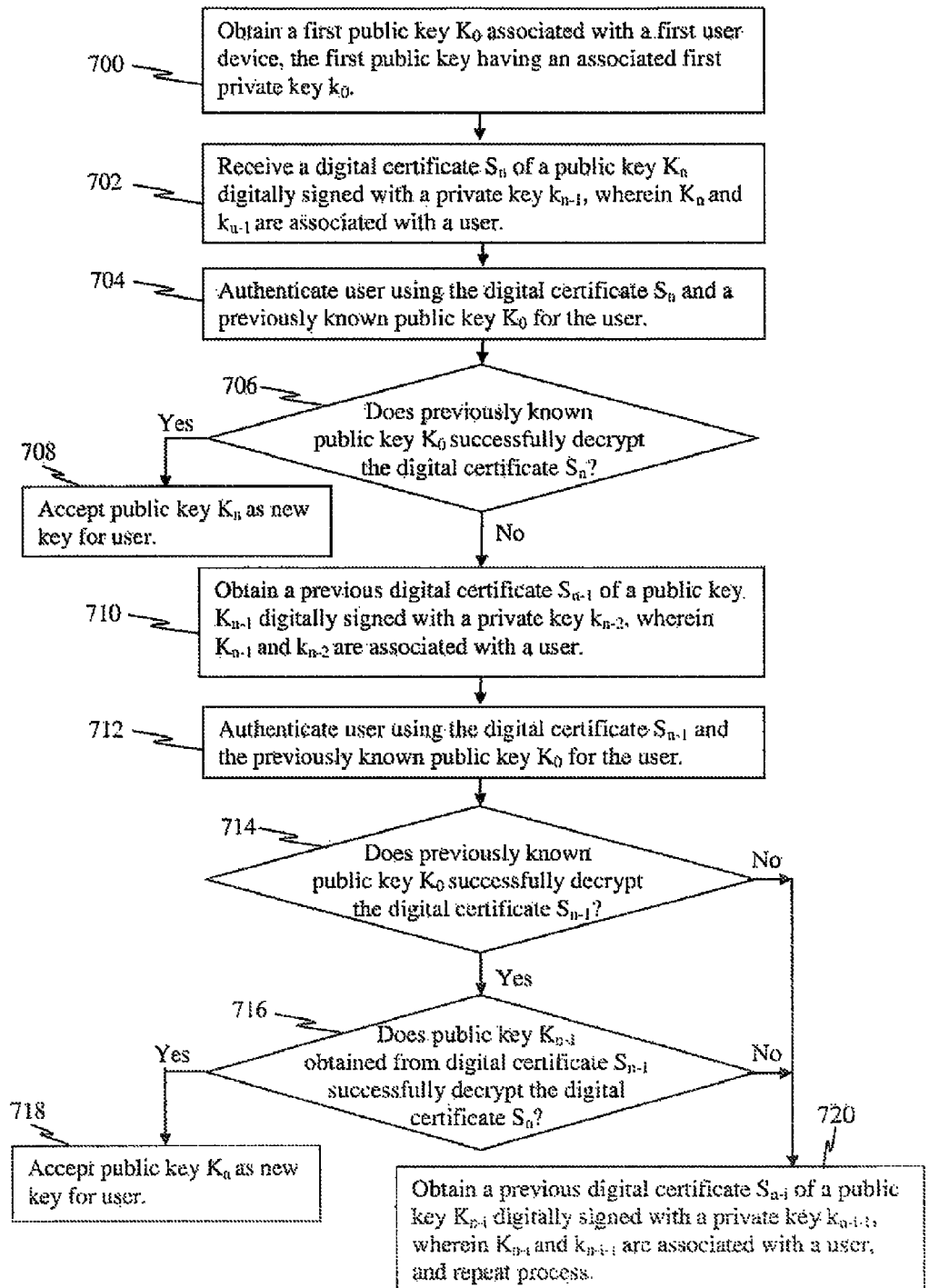
FIG. 7 is a flow diagram of a methodology for authenticating a replacement cryptographic key that has been replaced more than once.

FIG. 7 illustrates a method for authenticating a replacement cryptographic key that has been replaced more than once. In certain situations, a user can create more than one key for future use or can create numerous keys in succession but not validate each key with an authentication device. In an alternate configuration, a token (and associated key) might only be used once a year, or once every several years and it is possible for the user to go through several keys in that time frame without having each key pair authenticated or associated with a particular token. If an attempt is made to authenticate a token with an authentication device that has not received information from that particular token for a period of time, or has not received each subsequent key associated with the token, the authentication device may not be able to authenticate the token. In such situations, the authentication device may need information from each previous key for the token to authenticate the new key, such as in a daisy-chain fashion. If the authentication device still does not recognize that key, the authentication device may output the last key it does know, if it is able to establish a last known key. This allows the user to determine how many key pairs should be retrieved and communicated to the authentication device to authenticate the current key, and if such authentication can occur. If authentication is not able to be established, the user may not be able to recover from the event.

In one example of how a key may be updated on an authentication device is described herein. A first public key $K_0$ associated with a first user device is obtained by the authentication device, wherein the first public key is an associated with a first private key $k_0$ 700. A digital certificate $S_n$ of a public key $K_n$ digitally signed with a private key $k_{n-1}$ is received, wherein $K_n$ and $k_{n-1}$ are associated with a user 702. The user is authenticated using the digital certificate $S_n$ and a previously known public key $K_0$ for the user 704. A determination is made as to whether the previously known public key $K_0$ successfully decrypt the digital certificate $S_n$ 706. If the authentication is successful, the public key $K_n$ is accepted as the new active key for the user 708. Otherwise, if authentication fails, a previous digital certificate $S_{n-1}$ of a public key $K_{n-1}$ digitally signed with a private key $k_{n-2}$ is obtained, wherein $K_{n-1}$ and $k_{n-2}$ are associated with a user 710. The user is then authenticated using the digital certificate $S_{n-1}$ and the previously known public key $K_0$ for the user 712. This may involve recursively authenticating previous digital certificates and public keys to determine whether a new public key should be associated with a particular user. For example, a determination is made as to whether previously known public key $K_0$ successfully decrypts the digital certificate $S_{n-1}$ 714. If so, then a second determination is made as to whether public key $K_{n-1}$, obtained from digital certificate $S_{n-1}$, successfully decrypts the digital certificate $S_n$ 716. If so, the public key $K_n$ is accepted as the new key for the user 718. Otherwise, the process is repeated with a previous digital certificate $S_{n-i}$ of a public key $K_{n-i}$ digitally signed with a private key $k_{n-i-1}$, wherein $K_{n-i}$ and $k_{n-i-1}$ are associated with a user 720. In this manner, previous digital certificates may be utilized to authenticate a user's new public key.

By way of illustration and not limitation, if an owner replaces a key several times in a row, authentication by authentication devices that have not been kept up to date is still possible as long as the owner has kept the previous signatures and public keys. For example if the owner has gone from a first key (x, X) to a second key (y, Y) to a third key (z, Z) etc., using signatures Sx(Y) to certify Y with x, and Sy(z) to certify Z with y, then authentication by an authentication device that only knows X is possible by providing the authentication device with Y, Sx(Y), Z, and Sy(Z). By checking Sx(Y) using X, the authentication device will know that Y was a valid key for the owner and then by checking Sy(Z) the authentication device will know that Z is now a valid key for the owner.

This process continues such that a number of previous keys may be polled for information, until a key is recognized (such as the first key). It is also to be understood that authentication of the first key in the above example would be successful because the first key was previously known by the verification device.

It is to be appreciated that dynamic querying or automated querying of previous keys may be employed in connection with other configurations. For example, the system may be configured to automatically query and/or report previous information dynamically in accordance with an invalid authentication attempt. This may be performed by the token user inputting or retrieving previous key pair information. If the key pair was signed with each preceding key pair, as discussed above, the method can automatically access the information for each preceding key until authenticated. The user and/or an automated method of checking previous keys may be limited to a particular number of attempts, after which time authentication is denied. For example, the user or automated method may attempt to authenticate a key using up to five previous keys, for example. If authentication is not made with the fifth key attempt, authentication fails.

While some of the examples described refer to public key (asymmetric) cryptographic systems, these features may also be implemented on symmetric key systems. Symmetric key systems are a type of encryption system in which a sender and a receiver share a common or single key. That is, the same key is utilized for coding and decoding. Thus, symmetric key systems involve two parties that exchange a key in a secure manner. When a new key is created in accordance with a symmetric key system, a second key, such as "$Y_o$" only has the public key associated with it and is signed under the first key "X" and, possibly also signed with rules. In the situation of a symmetric key system, only public information is released and disbursed among a plurality of shareholders.

$$Y_o, Sig_x(Y_o RULES)$$

The examples described herein can employ a public-key cryptography that utilizes two keys, a public key that encrypts messages, and a private key that decrypts the messages. Thus, in a public-key system the public key may be distributed to everyone but the private key is not transmitted. The key itself is sent with the encryption of the new key, the new key under the previous key and an authentication of the encryption.

$$Y_o, E_x(Y_o), MAC_x(E_x(y_o), RULES)$$

A "message authentication code" or MAC has a hash value (a fixed length digital code) that is representative of the data that was actually input. The MAC is typically encrypted with the data itself and sent to an entity. That entity, upon receiving the encrypted data, decrypts the data and generates a new MAC on the data. The received MAC and the newly generated MAC are compared to authenticate that the data received is intact and to authenticate the information sender.

Figure 8:
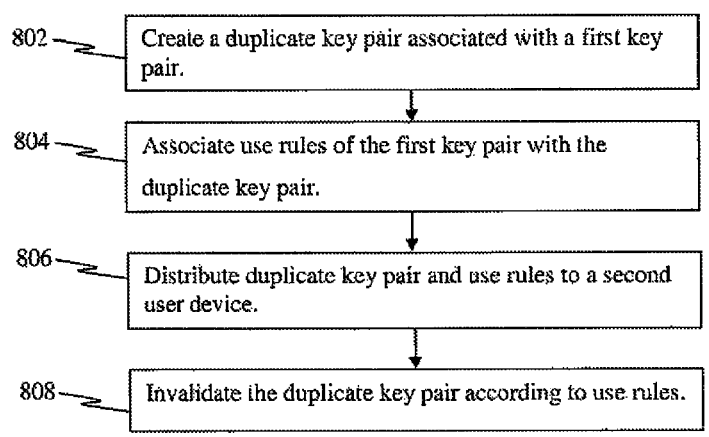
FIG. 8 is a flow diagram of a method for creating a duplicate cryptographic key.

FIG. 8 is a flow diagram of a method for creating a duplicate cryptographic key. A duplicate key pair is created and associated with a first key pair 802. The first key pair allows the owner to communicate with a device, such as a home security system. If the owner desires an alternative user to have the same or a similar level of access that the owner has, and duplicate key creation is acceptable, the owner can create a duplicate key pair to allow an alternate user authentication with a duplicate token. The duplicate key is created subject to certain use rules 804 set up either by the owner and/or a verification system. For example, an owner may have a home security system but would like another to have access to the house at certain times, such as every Thursday, for example. The user creates a duplicate key with rules that specify the duplicate key/token is authenticated only on Thursday(s). Then, the person in possession of the duplicate token (and corresponding duplicate key pair) can disable the security systems on Thursday(s). The duplicate key pair and use rules are then distributed to a second user device or token 806.

The duplicate token holder attempts authentication and determines whether rule(s) associated with the duplicate key are satisfied (e.g., is it Thursday?). If the rule(s) are satisfied, the duplicate key is authenticated. If the rule(s) are not satisfied, authentication is denied. So, for example, if the owner has specified a rule providing authorized access only on Thursday(s) and an alternate user attempts to use the token on a day other than Thursday, authentication is denied. The alternate user may receive a notification that it is an impermissible use and/or the use is outside authorized parameter(s). The owner may also receive notification of the attempt so that preventive measures may be taken, if necessary. The owner and/or the verifier device is also capable of modifying the rules/parameters if the situation changes. The owner and/or verifier device can also invalidate the duplicate key 808 at any time, with or without notification to the alternative/duplicate user.

Figure 9:
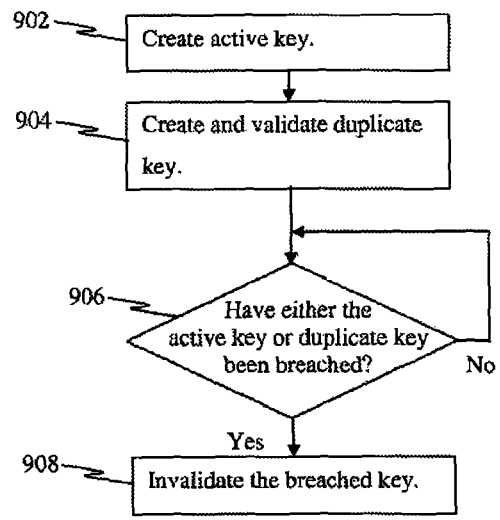
FIG. 9 illustrates a method for policing a cryptographic key and a duplicate cryptographic key.

FIG. 9 illustrates a method for policing a cryptographic key and a duplicate cryptographic key. A first key pair is created 902 having an associated public key and private key. A duplicate key is created 904 having a public key signed by the first private key. Both the first key, associated with a user token, and the duplicate key, associated with a similar user token, are monitored for a breaching condition 906. For example, a breaching condition can occur when a user device is lost or stolen, or when a cryptographic key associated with the device is compromised. If there is no breach indicated, the method continues to monitor for a breaching condition 906 in a loop fashion.

If there is a breach, the key pair that has been breach is invalidated 908. For example, if the duplicate key/token is compromised, the duplicate key pair will be invalidated and unable to be further used. Another duplicate key pair may be created by using the first key pair, which has not been breached. If, however, the first key/token is breached, the first key will be invalidated, which will automatically invalidate the duplicate key, unless a rule(s) specifies that the duplicate key is to remain valid for a set period of time, such as one more authentication attempts, to allow the owner to gain authentication by utilizing the duplicate key.

Figure 10:
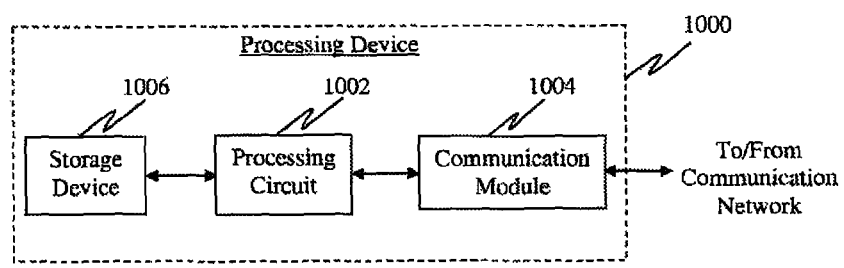
FIG. 10 is a block diagram of a processing device configured to generate and/or authenticate a spare cryptographic keys whenever a new cryptographic key is activated.

FIG. 10 is a block diagram of a processing device configured to generate and/or authenticate a spare cryptographic keys whenever a new cryptographic key is activated. The processing device 1000 may include a processing circuit 1002 coupled to a communication module 1004 and a storage device 1006. The processing circuit may be configured to generate a first private-public key pair (x, X). For instance, private key x may be stored in storage device 1006 while public key X may be distributed to verifier devices over a communication network.

Along with the creation of the first key pair (x, X), the processing circuit 1002 may generate a second (spare) private-public key pair (y, Y). In order to authenticate the second key pair, a signed certificate may be generated by signing the public key Y with the private key x. The second key pair (y, Y) and signed certificate may be partitioned into a plurality of shares that are distributed to (trusted) shareholders. In one implementation, less than the plurality of shares may be used to recreate the second key pair and/or signed certificate. Processing device 1002 may also be configured to perform one or more of the other methods and/or functions described herein.

It is to be understood that the examples and configurations described herein may be implemented by hardware, software, firmware, middleware, microcode, or any combination thereof. When the systems and/or methods are implemented in software, firmware, middleware or microcode, program code or code segments, they may be stored in a machine-readable medium, such, or in separate storage mediums. A code segment may represent a procedure, a function, a sub-program, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using suitable means including memory sharing, message passing, token passing, network transmission, etc.

What has been described above includes examples of one or more configurations. It is, of course, not possible to describe every conceivable combination of components or methodologies for purposes of describing these examples and configurations, but one of ordinary skill in the art may recognize that many further combinations and permutations of such examples and/or configurations are possible. Accordingly, the examples and configurations described herein are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

One or more of the components, steps, and/or functions illustrated in FIGS. 1, 2, 3, 4, 5, 6, 7, 8, 9, and/or 10 may be rearranged and/or combined into a single component, step, or function or embodied in several components, steps, or functions without affecting the various aspects of the invention. Additional elements, components, steps, and/or functions may also be added without departing from the invention. The apparatus, devices, and/or components illustrated in FIGS. 1, 3, 5, 6, and/or 10 may be configured to perform one or more of the methods, features, or steps described in FIGS. 2, 4, 7, 8 and/or 9.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the examples and configurations is intended to be illustrative, and not to limit the scope of the claims. As such, the present teachings may be readily applied to other types of apparatuses and many alternatives, modifications, and variations will be apparent to those skilled in the art.

The invention claimed is:

1. A method operational on a token device for replacing asymmetric cryptographic keys, comprising:
   generating at the token device a pseudorandom first key pair that comprises a first private key and a corresponding first public key;
   storing the first private key in a storage device of the token device;
   generating at the token device a pseudorandom spare second key pair that comprises a second private key and a second public key,
   signing the second public key with the first private key stored in the storage device to obtain a signed certificate adapted to authenticate the second public key when the first public key is replaced with the second public key;
   dividing the second key pair and signed certificate into n shares, where n is an integer; and
   distributing the n shares to at least two shareholders for safekeeping.

2. The method of claim 1, further comprising:
   retrieving at least a portion of the n shares from the at least two shareholders;
   reconstructing the second key pair and signed certificate from at least a portion of the n shares retrieved; and
   presenting the signed certificate to a verification device to replace the first public key with the second public key.

3. The method of claim 2, further comprising:
   distributing the signed certificate to an authentication device to replace the first public key with the second public key and invalidate the first key pair upon authentication of the second key pair.

4. The method of claim 2, further comprising:
   generating a third key pair when replacing the first key with the second key, the third key pair comprising a third public key and a third private key.

5. The method of claim 4, further comprising:
   signing the third public key with the second private key to obtain a second signed certificate;
   dividing the third key pair and second signed certificate into n shares, where n is an integer; and
   distributing the n shares of the third key pair to at least two shareholders for safekeeping.

6. The method of claim 5, further comprising:
   retrieving at least a portion of the n shares of the third key pair;
   recreating the third key pair from the at least a portion of n shares retrieved; and
   presenting the second signed certificate to a verification device to replace the second public key with the third public key.

7. The method of claim 2, wherein fewer than n shares are retrieved from the at least two shareholders and wherein the second key pair and signed certificate are reconstructed from the fewer than n shares retrieved.

8. The method of claim 1, further comprising:
   associating a trust level of the first key pair with a trust level for the second key pair.

9. The method of claim 1, wherein dividing the second key pair and signed certificate into shares is determined by a secret sharing scheme.

10. The method of claim 1 further comprising:
    creating a duplicate key pair of the first key pair;
    associating a set of use rules with the duplicate key pair; and
    distributing the duplicate key pair and use rules to a second token device.

11. The method of claim 10 further comprising:
    invalidating the duplicate key pair according to use rules.

12. A token device that facilitates replacing cryptographic keys, comprising:
    a processor; and
    a memory; wherein the memory stores computer executable instructions that when executed by the processor, causes the processor to:
    generate a pseudorandom first key pair that comprises a first private key and a corresponding first public key, and
    generate a pseudorandom spare second key pair that comprises a second private key and a second public key;
    sign the second public key with the first private key to obtain a signed certificate adapted to authenticate the second public key when replacing the first public key with the second public key;
    divide the second key pair and signed certificate into n shares, where n is an integer; and
    distribute the n shares to at least two shareholders for safekeeping.

13. The device of claim 12, wherein the memory stores additional computer executable instructions that when executed by the processor, causes the processor to:
    retrieve at least a portion of the n shares from the at least two shareholders;
    reconstruct the second key pair and signed certificate from the at least a portion of the n shares retrieved; and
    present the signed certificate to a verification device to replace the first public key with the second public key.

14. The device of claim 13, wherein the memory stores additional computer executable instructions that when executed by the processor, causes the processor to:
    send the second public key to a verification device that authenticates the second key pair and invalidates the first key pair upon authentication of the second key pair; and
    associate a trust level with the second key pair that corresponds with a trust level associated with the first key pair.

15. The device of claim 13, wherein the memory stores additional computer executable instructions that when executed by the processor, causes the processor to:
    distribute the signed certificate to an authentication device to replace the first public key with the second public key and invalidate the first key pair upon authentication of the second key pair.

16. The token device of claim 13, wherein the memory stores additional computer executable instructions that when executed by the processor, causes the processor to:
    retrieve fewer than n shares from the at least two shareholders and reconstruct the second key pair and the signed certificate from the fewer than n shares retrieved.

17. A token device that facilitates replacing cryptographic keys, comprising:

a processor; and a memory; wherein the memory stores computer executable instructions that when executed by the processor, causes the processor to:

generate a pseudorandom first key pair that comprises a first private key and a corresponding first public key, generate a pseudorandom spare second key pair that comprises a second private key and a second public key, sign the second public key with the first private key to obtain a signed certificate adapted to authenticate the second public key when the first public key is replaced with the second public key;

divide the second key pair and signed certificate into n shares, where n is an integer; and transmit the n shares to at least two shareholders for safekeeping.

18. The device of claim 17, wherein the memory stores additional computer executable instructions that when executed by the processor, causes the processor to:

receive at least a portion of the n shares from the at least two shareholders;

reconstruct the second key pair and signed certificate from the at least a portion of the n shares received; and send the signed certificate to a verification device to replace the first public key with the second public key.

19. The device of claim 18, wherein the memory stores additional computer executable instructions that when executed by the processor, causes the processor to:

authenticate the second key pair and invalidate the first key pair upon authentication of the second key pair.

20. The device of claim 19, wherein the memory stores additional computer executable instructions that when executed by the processor, causes the processor to:

generate a third key pair when replacing the first key with the second key, the third key pair comprising a third public key and a third private key.

21. The device of claim 18, wherein the memory stores additional computer executable instructions that when executed by the processor, causes the processor to:

distribute the signed certificate to an authentication device to replace the first public key with the second public key and invalidate the first key pair upon authentication of the second key pair.

22. The token device of claim 18, wherein the memory stores additional computer executable instructions that when executed by the processor, causes the processor to:

receive fewer than n shares from the at least two shareholders and reconstruct the second key pair and the signed certificate from the fewer than n shares retrieved.

23. The device of claim 17, wherein the memory stores additional computer executable instructions that when executed by the processor, causes the processor to:

create a duplicate key pair of the first key pair;

associate a set of use rules with the duplicate key pair; and distribute the duplicate key pair and use rules to a second token device.

24. The device of claim 17 wherein the memory stores additional computer executable instructions that when executed by the processor, causes the processor to:

invalidate the duplicate key pair according to use rules.

25. A non-transitory machine-readable medium having one or more instructions for replacing cryptographic keys, which when executed by a processor causes the processor to:

generate a pseudorandom first key pair that comprises a first private key and a corresponding first public key;

generate a pseudorandom spare second key pair that comprises a second private key and a second public key;

sign the second public key with the first private key to obtain a signed certificate adapted to authenticate the second public key when the first public key is replaced with the second public key;

divide the second key pair and signed certificate into n shares, where n is an integer; and distribute the n shares to at least two shareholders for safekeeping.

26. The non-transitory machine-readable medium of claim 25 having one or more instructions which when executed by a processor causes the processor to further:

retrieve at least a portion of the n shares from the at least two shareholders;

reconstruct the second key pair and signed certificate from the at least a portion of the n shares retrieved; and present the signed certificate to a verification device to replace the first public key with the second public key; and authenticate the second key pair and invalidate the first key pair upon authentication of the second key pair.

27. The non-transitory machine-readable medium of claim 26 having one or more instructions which when executed by a processor causes the processor to further:

distribute the signed certificate to an authentication device to replace the first public key with the second public key and invalidate the first key pair upon authentication of the second key pair.

28. The non-transitory machine-readable medium of claim 26, wherein the processor is instructed to retrieve fewer than n shares from the at least two shareholders and to reconstruct the second key pair and the signed certificate from the fewer than n shares retrieved.

29. The non-transitory machine-readable medium of claim 25 having one or more instructions which when executed by a processor causes the processor to further:

associate a trust level with the second key pair that corresponds with a trust level associated with the first key pair.

30. The non-transitory machine-readable medium of claim 25 having one or more instructions which when executed by a processor causes the processor to further:

create a duplicate key pair of the first key pair;

associate a set of use rules with the duplicate key pair; and distribute the duplicate key pair and use rules to a duplicate user device.

* * * * *